United States Patent

[11] 3,590,689

[72] Inventors Lee M. Brewer
Saginaw;
William R. Frei, Frankenmuth, both of, Mich.
[21] Appl. No. 880,318
[22] Filed Nov. 26, 1969
[45] Patented July 6, 1971
[73] Assignee General Motors Corporation
Detroit, Mich.

[54] VEHICLE CENTRAL HYDRAULIC SYSTEM
6 Claims, 3 Drawing Figs.

[52] U.S. Cl. .................................................. 91/412, 60/52
[51] Int. Cl. .................................................. F15b 13/09
[50] Field of Search........................................... 60/525; 91/412

[56] References Cited
UNITED STATES PATENTS
1,890,010  12/1932  Vickers ..................... 60/52 S
3,131,538  5/1964  Schultz et al. ................. 60/52 S
3,364,821  1/1968  Gephart et al. ................. 60/52 S
3,434,282  3/1969  Shelhart ........................ 60/52 S Primary Examiner—Edgar W. Geoghegan
Attorneys—W. E. Finken and D. L. Ellis

ABSTRACT: A central hydraulic system combining the hydraulic power steering gear and a hydraulic power brake booster for operation by a common source of pressurized fluid is arranged to have a primary pump supply the inlet of an open center power steering control valve and have the inlet of the power brake booster open center valve draw from the outlet of the steering gear. In the event the steering gear is caused to engage the chassis limit stops and its control valve held fully actuated so that a condition of substantially reduced flow circulation is established therethrough, a low flow bypass valve delivers incoming pressure fluid from the pump directly to the power brake booster. A secondary electric motor-driven pump is arranged in the system to operate in the event of failure of the primary pump and directly supplies the power steering gear inlet with the low flow bypass valve again being subject to low flow conditions in the latter to directly supply the power brake booster.

PATENTED JUL 6 1971

3,590,689

INVENTORS
Lee M. Brewer &
William R. Frei
BY D. L. Ellis
ATTORNEY

VEHICLE CENTRAL HYDRAULIC SYSTEM

This invention relates to hydraulic systems for operating accessory components of automotive vehicles and more particularly to central hydraulic systems wherein several such components are served by a common fluid source.

Specifically, the invention provides a central hydraulic system utilizing the conventional engine driven power steering pump as a common source for both the power steering gear as well as another power accessory of the vehicle such as an hydraulic booster for the vehicle brake system. The pump directly supplies the inlet of an open center flow control valve of the power steering gear, the outlet of such valve being communicated to the inlet of an open center flow control valve incorporated in the hydraulic brake booster. The outlet or return of the brake booster valve communicates directly with the reservoir or sump from which the primary pump draws. Such a series communicated system of open center valves for the two accessories, as well as any additional accessory, provides a relatively uncomplex, effective arrangement for utilizing a common pressure source without sacrificing the safe supply of fluid pressure boost to either of the steering and brake accessories.

In the use of such a series connected system, however, there are certain conditions wherein fluid return from the steering gear may be so inadequate that the power brake booster may not have sufficient supply of pressure fluid. Particularly, in conditions wherein the power steering gear is actuated to a turn condition engaging upon the chassis stops or upon a roadway curb, and wherein the steering gear control valve is displaced to a fully actuated position directing all of the incoming pressure fluid to one side of the steering gear, flow through the steering gear may be reduced to zero or substantially zero. In these conditions, a low flow bypass valve arrangement according to the invention incorporated within the conduit between the pump and the steering gear inlet and in the conduit between the steering gear outlet and the brake booster, automatically assumes a condition wherein flow normally supplied only to the steering gear inlet is also supplied directly to the brake booster valve inlet. Once the low flow conditions in the steering gear are removed by return of the steering gear to a normal operating condition, the series connected system is again established for maximum effectiveness.

It is a primary object of this invention to provide a central hydraulic system for automotive vehicle power accessories wherein such accessories as the power steering gear and hydraulic brake booster are connected in series with a common pressure fluid source, the normal series connection between the steering gear and the brake booster being changed to a parallel relation when predetermined low flow operating conditions through the first downstream accessory of the system occur.

It is a more specific object of this invention to incorporate within a series connected central hydraulic system for vehicle power steering gear and other power accessories a low flow bypass valve arrangement within the conduits leading to an open center power steering valve inlet and leading from the return or exhaust thereof and which is responsive to a predetermined minimum flow therethrough to establish a condition of direct supply of pressure fluid from the fluid pressure source in parallel to both the steering gear and the remaining vehicle accessories.

A further object of this invention is to incorporate within a central hydraulic system such as above described a secondary source of pressure fluid operative in the event of failure of the primary pressure source to supply pressure fluid to the series connected vehicle accessories, such secondary source again being subject under low flow conditions in the steering gear to an automatic selection of a parallel or bypass supply of pressure fluid directly to the brake booster or other accessory as well as the vehicle steering gear.

Yet another object of this invention if to provide a low flow bypass and check valve construction of relatively compact and simple construction which may be applied as a structural unit directly to or within the steering gear unit of the series connected central hydraulic system, more particularly for insertion within the conduits between the pressure source and the brake booster and respectively the inlet and return ports of the steering gear control valve.

More specific objects of the invention relate to the use of a single bypass valve member operable to function in the above described manner when the pressure fluid is supplied from either the primary or a secondary source, as well as to certain features of construction whereby low flow bypass conditions of different value may be established for the bypass valve member in correspondence with different flow capacities for the primary and secondary sources.

These and other objects, features and advantages of the invention will be readily apparent from the following specification and from the drawings wherein.

Figures 1, 2, 3:
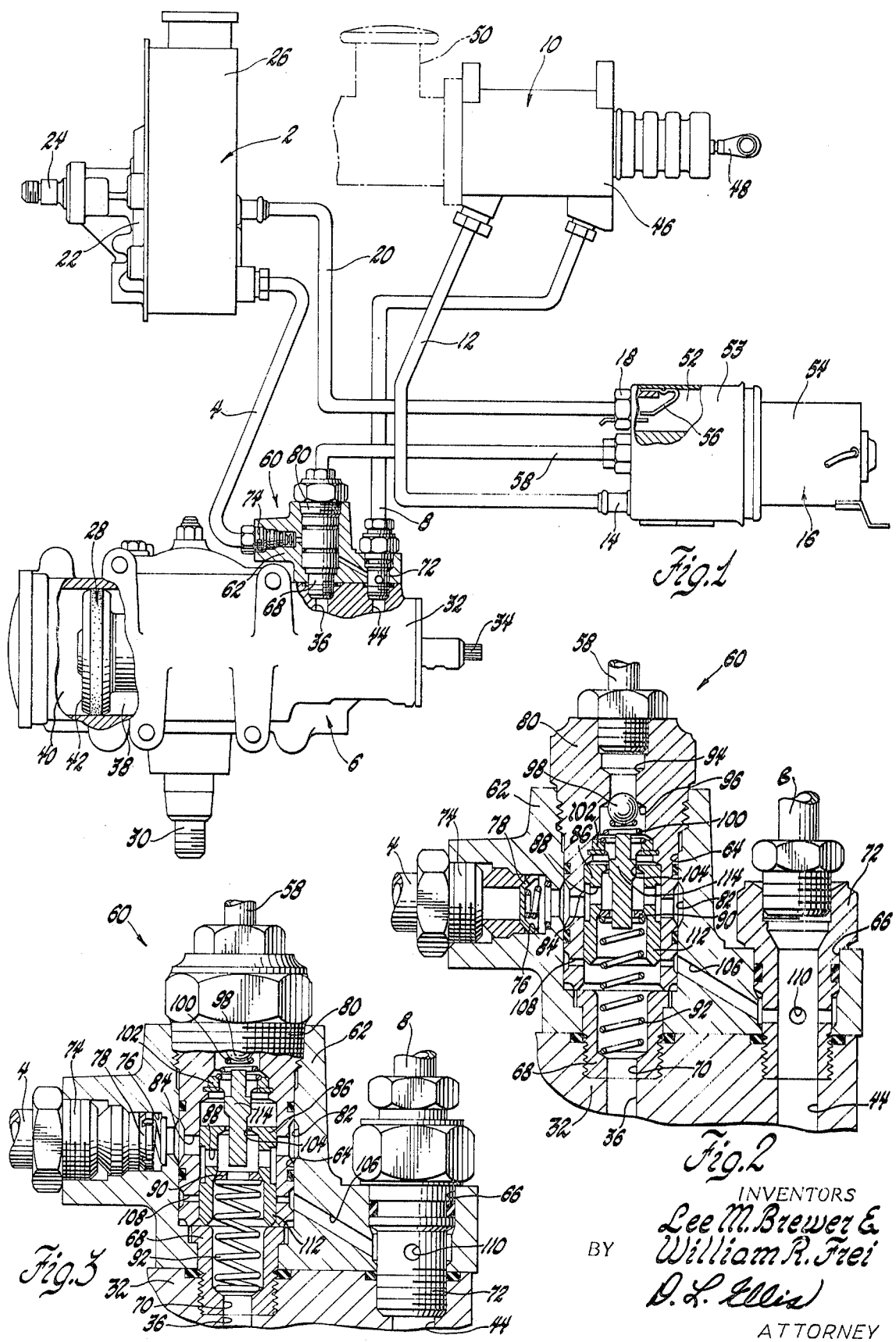
FIG. 1 is a diagrammatic partially broken away view of a central hydraulic power steering and brake booster system for automobiles according to the invention.
FIG. 2 is an enlarged view, in section, of a portion of FIG. 1 showing the low flow bypass and check valve assembly in bypass condition.
FIG. 3 is a view similar to FIG. 2 showing the low flow bypass and check valve assembly in normal condition.

Referring now particularly to FIG. 1 of the drawings, there is shown in diagrammatic fashion a central hydraulic steering gear and brake booster system for automotive vehicles. For illustrative purposes, the system includes only the steering gear and brake booster accessories, although it will be understood that, depending upon the capacity of the pressure source used, along with other factors, additional hydraulic accessories may be included in series connected relation within the system. Further, while the system to be specifically described includes a backup or secondary source of fluid pressure operative in the event of failure of a primary pump or fluid pressure source, and accordingly certain aspects of the low flow bypass control valve arrangement accommodates such use, it will be understood that the fundamental aspects of the system obtain, absent such a backup or secondary pressure source.

In the preferred embodiment shown, the system includes a primary hydraulic pump and reservoir unit designated generally as 2, connected by a conduit 4 to a hydraulic power steering gear or unit 6, such conduit 4 carrying pressure fluid delivered by the pump to the inlet of the steering gear as will be described. Fluid returning from the steering gear travels a conduit 8 to the inlet of the power booster portion of a hydraulic power brake or unit 10. Fluid circulating through the power brake is returned via a conduit 12 to an inlet 14 of a backup or reserve pressure source 16 to normally just circulate therethrough and, during such normal primary pump operation exit through a reservoir port 18 and travel a conduit 20 connected with the reservoir portion of pump unit 2.

Referring first to the pump and reservoir unit 2, the same is of generally conventional construction and may accord, for example, with the disclosure of U.S. Pat. No. 3,207,077 to Zeigler issued Sept. 21, 1969 and assigned to the assignee of the present invention. It includes a rotary vane type impeller unit indicated at 22 driven by an input shaft 24 which may be suitably connected by pulley means to be driven by an engine belt. As indicated, the reservoir housing 26 is constructed as a unit with the impeller unit 22 and is adapted to hold a supply of fluid from which the impeller unit draws to supply pressurized fluid through conduit 4 to a low flow bypass and check valve apparatus on the steering gear 6.

STeering gear 6 is again of generally conventional construction and may accord generally with the disclosure of U.S. Pat. No. 3,022,772 to Zeigler et al. issued Jan. 27, 1962 and assigned to the assignee of the present invention. This steering gear is of the integral inline type including a servomotor unit 28 connected by suitable rack and sector reduction gearing to drive a pitman shaft 30 which is adapted for connection to the vehicle steering linkage. While not shown in detail, the steering gear further includes rotary control valve structure in generally coaxial alignment with the servomotor 28 in a portion 32 of the steering gear housing, such control valve being operated through rotary input delivered from the operator's steering wheel to an input stub shaft 34. AS explained more fully in the Zeigler et al. patent on this steering gear, the control valve is of open center flow configuration; i.e., incoming pressure fluid delivered through an inlet port 36 of the steering gear circulates freely through the control valve portion of the steering gear and between the two fluid chambers 38 and 40 at either side of the servomotor piston 42 when the control valve is in a neutral or nonactuated position, such free circulation through the steering gear ultimately being exhausted through a return port 44 in housing portion 32 to the remainder of the fluid system. As also explained more fully in the patent, input steering rotation in either direction on input stub shaft 34 to steer the vehicle causes gradual closing of one set of ports in the control valve leading to one of the sides or chambers 38 and 40 of the servomotor while concurrently further opening another set of ports leading to the other side or chamber of the servomotor, thereby to gradually build up pressure in the one chamber for power assist in aid of the turning effort applied to input stub shaft 34 while concurrently permitting free return of the fluid in the other or unpressurized chamber through the control valve and return port 44 to the remainder of the system. In most every operating condition of steering gear 6 fluid is continuously circulating through inlet port 36 and through the control valve and servomotor portions of the steering gear to exit return port 44, but in certain conditions such flow may approach zero. For example, in a situation where the servomotor portion of the steering gear and the piston 42 thereof and the pitman shaft 30 are located in an extreme limit position corresponding to a full turn of the steering linkage of the vehicle up against the limit stops of the chassis, the servomotor piston is thus prevented from further chamber expansion and contraction at its opposite sides. If in such a situation the vehicle operator for some reason fully actuates or continues to actuate stub shaft 34 to turn the steering gear further into the chassis stops, maximum pressure is of course applied to one side of the piston, but return flow from contraction of the opposite side thereof will be prevented. The result is that high pressure demand is placed on pump unit 2 transmitting through conduit 4 to within a portion of steering gear 6, but no fluid flow or substantially no fluid flow occurs through conduit 4 and through return port 44. In such a situation the series connected power brake unit 10 may suffer from fluid starvation and perform inadequately.

Power brake 10 may accord generally with the details of the disclosure of U.S. Pat. No. 3,364,821 to Gephart et al. issued Jan. 23, 1969 and assigned to the assignee of the present invention. It includes a servomotor and control valve unit 46 actuable by a shiftable input push rod 48 responsive to depression of the operator's brake pedal to utilize circulating pressure fluid delivered through conduit 8 to selectively build pressure for application to a piston mechanically connected for power boost operation of the usual master cylinder assembly, indicated at 50 in broken lines. Reference may be had to the patent for more detail, but generally, as with the steering gear 6, the control valve of the servomotor control valve unit 46 is of open center flow configuration such that, with the control valve in a neutral condition in the absence of brake pedal input on push rod 48, fluid flows therethrough from conduit 8 back to conduit 12 at low pressure. Upon actuation of push rod 48, incoming pressure fluid from conduit 8 suffers a valve restriction and buildup of pressure for application to one side of the power piston of unit 46, the other side of the piston being exhausted through conduit 12. Cessation of input on push rod 48 is accompanied by a spring centered return of the control valve to neutral wherein the two sides of the servomotor piston in unit 46 are again at low pressure.

Conduit 12 connects through inlet 14 of reserve source 16 to a pump supply chamber 52 thereof. Such chamber is formed in a housing 53 which includes generally conventional gear type pumping apparatus, not shown, driven by an electric motor 54. With primary pump 2 in normal operation, fluid delivered thereby circulates through the steering gear 6, conduit 8, power brake servomotor and valve unit 46, conduit 12 and chamber 52 to exit via conduit 20 back to the reservoir portion of pump unit 2. In the event that pump unit 2 fails, or for any other reason pressure fluid of predetermined minimum flow does not circulate from conduit 12 to chamber 52, a flow switch 56 senses the absence of the predetermined minimum flow and automatically causes energization of motor 54. Reserve source 16 then becomes operative to supply steering gear 6 and brake 10 with pressure fluid by drawing fluid through conduits 20 and 12 into chamber 52 and to deliver pressurized fluid to a conduit 58 leading to the low flow bypass and check valve apparatus on steering gear 6, now to be described.

THe low flow bypass and check valve assembly is designated generally as 60, and it will be noted that it is constructed as a structural unit adapted for attachment upon the control valve portion 32 of the steering gear housing. Alternatively, it may be structurally integrated with the control valve inside housing portion 32. It will further be noted that essentially, valve assembly 60 is interposed within the conduits 4, 8 and 58 which would normally lead directly to the inlet and return parts 36 and 44 of steering gear 6. Referring more particularly to FIGS. 2 and 3, the valve assembly includes a valve body 62 including a main bore 64 and a spaced second bore 66, each of such bores adapted to align coaxially with the inlet and return ports 36 and 44 of the steering gear. A fitting 68 opening to the main bore 64 includes a port 70 communicating with inlet port 36 while a similar fitting 72 in bore 66 communicates with return port 44. Conduit 4 communicates through a fitting 74 to a lateral passage 76 formed on an axis intersecting main bore 64. Check valve structure 78 of generally conventional spring biased construction is located within passage 76 to permit fluid flow from conduit 4 into the main bore 64 but prevent reverse direction of flow through passage 76.

Threaded suitably within main bore 64 is an elongated cylindrical fitting 80 provided with an annular groove cooperating with a like complementary groove in bore 64 to form an annular passage 82. A plurality of supply ports 84 in fitting 80 opening to passage 82 connect passage 76 with the internal central bore of the fitting. Mounted slidably within such internal bore is a bypass valve element 86, again of cylindrical hollow construction, and including an annular external groove communicated with a plurality of ports 88 connecting ports 84 to the interior of the valve element. Thus, under normal conditions of system operation, pressure fluid delivered from pump 2 travels from passage 76 and ports 84 and 88 to flow via main bore 64 to steering gear inlet 36. These normal conditions are best illustrated in FIG. 3 wherein it is seen that valve element 86 is located in a downwardly displaced position bottomed on fitting 68. The valve element is biased to this position under the pressure differential created by pressure drop occurring with flow through the interior of the valve element to the inlet 36 via an orifice element 90 having its central aperture sized properly in accordance with objectives to be outlined hereinafter. Opposing the bias created by such orifice is a coil compression spring 92 seated between the orifice element and fitting 68.

Referring again to FIG. 2, cylindrical fitting 80 is further provided in its exposed end portion with a connection for conduit 58 leading to a counterbored passage 94 which in turn communicates with a port 96 formed with a ball valve seat cooperable with a check ball valve 98. The ball valve is spring biased with predetermined force to a closed position to close port 96 by a coil compression spring 100 seating between the ball and restrictor pin element 102. Pin element 102 is seated between an internal shoulder of fitting 80 and snap ring mounted therein. It will be appreciated that ball valve 98 prevents circulating fluid entering from conduit 4 to pass upwardly through fitting 80 into conduit 58 during operation of pump 2, but in the event of failure of such pump and automatic operation of reserve source 16, the consequent incoming pressure fluid entering from conduit 58 unseats the ball valve so that such reserve fluid pressure may travel passage 94 and port 96 to pass through apertures in pin element 102 and enter the interior of valve element 86 through an orifice 104 formed therein. Pressure fluid from the reserve source is thus supplied to power steering gear inlet 36, and in such conditions check valve 78 is of course seated by the resulting pressure in passage 76 to prevent reverse flow therethrough.

Valve body 62 of the bypass and check valve assembly 60 is further provided with a lateral bypass passage 106 communicating at one end thereof with an annular groove on the exterior of fitting 80 which has communication with a plurality of bypass ports 108 leading to the interior of the fitting. The other end of passage 106 connects with an annular groove in the valve body bore 66 which in turn communicates to a plurality of radial ports 110 within fitting 72, such ports 110 communicating directly with steering gear return port 44 and conduit 8.

The operation of the system is as follows. As described above, with normal operation of primary pump 2 delivering fluid flow through conduit 4 to the inlet 36 of steering gear 6, such fluid flow circulates through the steering gear to be employed in varying degrees of pressure therewithin to actuate the servomotor piston 42 thereof over its range of positions corresponding to that of the dirigible vehicle wheels, and the circulating flow therewithin returns or exhausts through return port 44 to the conduit 8. This flow circulating through conduit 8 may be employed for actuation of the servomotor unit 46 of the power brake 10 and, regardless of the extent of such utilization of the pressure fluid circulating therethrough, the flow exits to conduit 12 to circulate through chamber 52 of reserve source 16, thence through conduit 20 to the reservoir of the pump unit 2. Referring to FIG. 3, and given the flow rates normally desired for operation of conventional power steering gear and open center power brake booster units in today's vehicles, an absolute minimum flow of approximately 1½ gallons per minute of oil flowing through passage 76 to the interior of valve element 86 will preferably, through proper sizing of orifice 90, cause sufficient pressure drop across the orifice so that the valve element is urged to its downwardly depressed position against the action of spring 92. The actual fully bottomed position of the part shown in FIG. 3 corresponds preferably to a flow through the orifice of about 3 gallons per minute which is about the normal operating flow for the series connected central system herein disclosed. In this position, a land 112 formed as the external cylindrical surface of valve element 86 completely closes bypass ports 108 so that flow entering passage 76 may communicate only with the steering gear inlet 36. However, as unusual operating conditions are encountered within steering gear 6 such as described above for the example of low flow resulting from abutment of the steering linkage on the vehicle chassis stops or upon a roadway curb, the reduction in flow occasioned through orifice 90 of course reduces the pressure drop thereacross permitting spring 92 to move valve element 86 toward the raised bypass position of FIG. 2. Specifically, when about 1½ gallons per minute of flow is encountered within passage 76 and orifice 90, spring 92 is permitted to locate the valve element slightly below the position of FIG. 2, to begin opening of bypass ports 108. Thus, in this low flow condition, pressure fluid delivered by pump 2 may bypass directly to bypass passage 106 to deliver through conduit 8 to power brake 10. Starvation of the power brake unit is thus avoided.

Identical operating conditions obtain when the incoming pressure fluid to the steering gear is being supplied by the reserve source 16 when the pump unit 2 has failed. Here again, valve element 86 is maintained in the depressed condition of FIG. 3 until the predetermined minimum value of flow is occasioned through passage 94 as a result of the conditions outlined above when the steering gear is actuated fully into its chassis stops, the valve element under such conditions responding to the lack of sufficient flow by moving to the bypass condition of FIG. 2 under the bias of spring 92. Specifically, when pressure fluid is supplied by reserve source 16, the pressure fluid entering port 96 flows through the apertured pin element 102 to traverse orifice 104 of the valve element. The pressure drop occasioned by such orifice provides the pressure differential acting on the end face of the valve element to urge it to its depressed condition of FIG. 3. In the case of orifice 104, the value of flow therethrough at which the valve element 86 is located in an incipient bypass condition may be selected substantially below the bypass flow rate used in the sizing of the orifice 90, to reflect any difference in flow capacity between pump units 2 and 16.

It will be noted that the elongated pin portion of pin element 102 cooperates with both orifices 90 and 104 to establish the proper flow apertures necessary to the required pressure drops across the orifice elements. Thus, the pin element includes an enlarged diameter portion 114 cooperable with orifice structure 104. Further, considering the gradual movement in valve element 86 from its bypass condition of FIG. 2 toward its normal or depressed condition of FIG. 3, it is to be noted that as such valve element movement occurs, orifice 90 slides over pin element 102 a short distance until the orifice element completely removes therefrom, thereby establishing a much larger flow aperture through the orifice element such as seen in FIG. 3. In this way, the pressure drop across the orifice may be significantly reduced when normal operating conditions of 3 gallons per minute from pump unit 2 is attained thereby to eliminate the deleterious effects of overheating of the fluid, etc., which may occur with a larger pressure drop and resultant system back pressure in pump unit 2.

Similarly, in conditions of pressure fluid supply from the reserve source 16, the reestablishment of normal operating conditions in steering gear causing the return of the valve element 6 to its normal position of FIG. 3 also causes orifice structure 104 to traverse first the enlarged diameter portion 114 of pin element 102 until, when sizable flow rate is reestablished, the orifice structure becomes juxtaposed to the reduced diameter of the pin element thereby to increase the orifice aperture and reduce the pressure drop thereover.

As a further important feature of this invention to be taken in conjunction with the features outlined in the introductory portions hereof, the low flow bypass valve of this invention operates as a fail-safe device when, for some reason, there occurs a blockage in the fluid system downstream of steering gear 6 preventing flow of fluid from the pressure source and through the conduit 8 to the power brake. In these events, power operation of the steering gear could be affected since no substantial flow circulation is available to the control valve portion thereof to direct a pressure differential in favor of one or the other fluid chambers in the gear. However, by the fail-safe feature of the low flow bypass valve, the resulting high pressure condition within, for example, both conduits 4 and 8 is effective to shift the valve element 88 upwardly to its position of FIG. 2. This occurs since, with no flow through orifice 90, the spring 92 thereof will shift the valve element upwardly in view of the balance of high pressures at either end of the valve element. Accordingly, the inlet and return portions 36 and 44 of the steering gear are placed in direct fluid circuit, also subject to these high pressure conditions, but however allowing direct communication between the two opposite end chambers of the steering gear servomotor permitting manual turning effort to be applied to the steering gear to turn the same to the desired steering angle without the presence of the hydraulic locking of one chamber as would normally result were there no such direct connection.

Having thus described the invention, what we claim is:

1. In a central fluid system for an automotive vehicle, a source of pressurized fluid, a reservoir, a first fluid servomotor for said vehicle including control valve means of open center flow configuration and having an inlet port and an exhaust port, first conduit means connecting said source with said inlet port, a second fluid servomotor for said vehicle including control valve means of open center flow configuration and having an inlet port and an exhaust port, second conduit means connecting the exhaust port of the first named control valve with the inlet of the last named control valve, third conduit means connecting the exhaust port of the last named control valve with said reservoir, low flow bypass valve means interposed in said first and second conduit means, said valve means including first and second passage means within said first conduit means respective to and normally connecting said source and said inlet of said first named control valve and third passage means communicated to said second circuit means and adapted for connection to said source through said first conduit means, said valve means including a valve element movable between a first position connecting said first and second passage means and closing said third passage means and a second position communicating said third passage means with said first and second passage means, means biasing said valve element to said second position thereof, and flow responsive means in said first conduit means counteracting said biasing means to locate said valve element in said first position thereof until flow from said source through said first conduit means reaches a predetermined minimum value.

2 In a central fluid system for an automotive vehicle, a primary source of pressurized fluid, a secondary source of pressurized fluid operative in the event of failure of said primary source, a reservoir, a first fluid servomotor for said vehicle including control valve means of open center flow configuration and having an inlet port and an exhaust port, first conduit means connecting said primary source with said inlet port, a second fluid servomotor for said vehicle including control valve means of open center flow configuration and having an inlet port and an exhaust port, second conduit means connecting the exhaust port of the first named control valve with the inlet of the last named control valve, third conduit means connecting the exhaust port of the last named control valve with said reservoir, fourth conduit means connecting said secondary source with said inlet of said first named control valve, low flow bypass and check valve means interposed in said first, second and fourth conduit means, said valve means including first and second passage means within said first and fourth conduit means respectively, third passage means connected to said inlet of said first named control valve and fourth passage means communicated to said second conduit means and adapted for connection to either of said sources through said first and fourth conduit means, said valve means including a pair of check valves in said first and fourth conduit means preventing communication of said sources therethrough, said valve means further including a valve element movable between a first position connecting said first and second passage means with said third passage means and closing said fourth passage means and a second position communicating said fourth passage means with said first, second and third passage means, means biasing said valve element to said second position thereof, and flow responsive means in said first and fourth conduit means operative to counteract said biasing means to locate said valve element in said first position thereof under flow from either of said sources above a predetermined minumum value.

3. In a central hydraulic system for an automotive vehicle including a source of pressurized fluid, a hydraulic power steering gear having an inlet port and an exhaust port, and a hydraulic servomotor for operating a further item of vehicle control and adapted to utilize exhaust fluid from said steering gear, a low flow bypass valve comprising, a valve body having first and second ports connected with said source and said steering gear inlet respectively, a third port in said housing connected with said steering gear exhaust port, a valve spool slidable in said housing between a first position wherein said first and second ports are communicated and said third port is closed and a second position wherein said first port is communicated with both said second and third ports, spring means biasing said valve spool to the second position thereof, and orifice means on said valve spool in the path of flow from said first to said second port and responsive to flow therethrough to counteract said biasing means to locate said valve spool in the first position thereof until a predetermined minumum rate of flow is reached within said first and second ports.

4. In a central hydraulic system for an automotive vehicle including a primary source of pressurized fluid, a secondary source of pressurized fluid operative upon failure of said primary source, a hydraulic power steering gear having an inlet port and an exhaust port, and a hydraulic servomotor for operating a further item of vehicle control and adapted to utilize exhaust fluid from said steering gear, a low flow bypass and check valve comprising, a valve body having first and second ports connected with said primary source and said secondary source respectively, third and fourth ports in said housing connected with said steering gear inlet and exhaust ports respectively, a pair of check valves in said housing functional over said first and second ports to prevent flow from either of said sources therethrough to the other of said sources, a valve spool slidable in said housing between a first position wherein said first and second ports are communicated with said third port and said fourth port is closed and a second position wherein said first and second ports are communicated with both said third and fourth ports, spring means biasing said valve spool to the second position thereof, and orifice means on said valve spool in the paths of flow from said first to said third port and from said second to said third port and responsive to flow through either of such paths from the respective one of said sources to counteract said biasing means and locate said valve spool in the first position thereof until a predetermined minumum rate of flow occurs through said third port.

5. The valve recited in claim 4 wherein said valve spool is constructed with a hollow interior through which flow passes from said first or second ports to said third port, a pair of orifice structures in said spool interior sized respectively to said primary and secondary sources, and a restrictor pin on said housing projecting into said spool interior to function within both said orifice structures.

6. The valve recited in claim 5 wherein said restrictor pin is sized variably over its length so that the orifices between said pin and said orifice structures increase as said spool moves from the second toward the first position thereof.